US006876973B1

(12) United States Patent
Visconti

(10) Patent No.: US 6,876,973 B1
(45) Date of Patent: Apr. 5, 2005

(54) RESTAURANT DIRECTORY AND MARKETING SYSTEM

(76) Inventor: John Visconti, 725 S. Curson Ave., Los Angeles, CA (US) 90036

( * ) Notice: Subject to any disclaimer, the term of this patent is extended or adjusted under 35 U.S.C. 154(b) by 0 days.

(21) Appl. No.: 09/542,018

(22) Filed: Apr. 3, 2000

(51) Int. Cl.[7] .............................................. G06F 17/60
(52) U.S. Cl. ........................................... 705/5; 705/15
(58) Field of Search ..................................... 705/5, 15

(56) References Cited

U.S. PATENT DOCUMENTS

| | | | | |
|---|---|---|---|---|
| 5,272,474 A | * | 12/1993 | Hilliard .................. | 340/825.08 |
| 5,597,307 A | | 1/1997 | Redford et al. | |
| 5,624,265 A | | 4/1997 | Redford et al. | |
| 5,749,735 A | | 5/1998 | Redford et al. | |
| 5,788,507 A | | 8/1998 | Redford et al. | |
| 5,794,210 A | | 8/1998 | Goldhaber et al. | |
| 5,795,156 A | | 8/1998 | Redford et al. | |
| 5,839,905 A | | 11/1998 | Redford et al. | |
| 5,845,263 A | * | 12/1998 | Camaisa et al. ............... | 705/27 |
| 5,850,433 A | * | 12/1998 | Rondeau ..................... | 379/201 |
| 5,911,582 A | | 6/1999 | Redford et al. | |
| 5,937,386 A | | 8/1999 | Frantz | |
| 5,957,695 A | | 9/1999 | Redford et al. | |
| 5,963,924 A | | 10/1999 | Williams et al. | |
| 2001/0049613 A1 | * | 12/2001 | Gramann, III et al. ......... | 705/5 |

FOREIGN PATENT DOCUMENTS

JP          2001243304 A  *  9/2001   ........... G06F/17/60

OTHER PUBLICATIONS

Kime, et al. Developing a Restaurant Revenue–Management Strategy, Cornell Hotel & Restaurant Administration Quarterly, Vo 40, Iss. 5, Oct. 1999, p. 18.*

Ansel, et al., A framework for Restaurant Information Technology, Cornell Hotel & Restaurant Administration Quarterly, vol. 40 Iss. 3, Jun. 1999, p. 74(1).*

Michael Kasavana, Who's Next? (automated restaurant seating management systems) (ComputerLink), Restaurant Business, vol. 91, No. 11, Jul. 20, 1992, pp. 210–212.*

Kimes, et al., Restaurant Revenue Management : Applying Yield Management to the Restaurant Industry, Cornell Hotel & Restaurant Administration Quarterly, vol. 39, No. 3, Jun. 1998, p. 32 (8).*

Joseph Duracher, Front Runner, Restaurant Business, vol. 98, No. 4, Feb. 15, 1999, pp. 109–110.*

(Continued)

Primary Examiner—Ronald Laneau
(74) Attorney, Agent, or Firm—I. Michael Bak-Boychuk

(57) ABSTRACT

A method useful with a computer network for providing a searchable data base of restaurants which can be accessed by prospective patrons, and once having obtained access the patron can then examine the listing and select the desired restaurant. Upon selection, the prospective patron exchanges with the restaurant data base an interactive information exchange in which the patron specifies the desired reservation date and time and the number of prospective guests. Upon receipt of this information a comparison is made between the seats desired and the number of seats estimated to be available at that time, and if the comparison matches then the requested reservation is confirmed. If there is no match, then an automated arithmetic process computes the next available time and submits that to the patron in the interactive process. In the course of the foregoing computation the process adopts a running average of occupancy intervals which is then used to estimate the next available time. This interval may be based on payment reconciliation, provided by a concurrently running process. Various attention garnering devices may be utilized by each restaaurant to attract the potential patrons.

2 Claims, 7 Drawing Sheets

OTHER PUBLICATIONS www.opentable.com/info/about.asp, 1999–2000, printed Apr. 3, 2002.* www/opentable.com/info/helpindex.asp,1999–2000, printed Apr. 3, 2002.* http://home5.americanexpress.com/merchant/bizsave/opentable.asp, printed Apr. 3, 2002.*

OpenTable.com Releases Second Generation Restaurant Reservation and Management Tool, News and Press Releases, opentable.com/info/19991108.html, printed Apr. 3, 2002.*

Alastair Goldfisher, E&O Trading Co. Plugged Into New Reservation System, The Business Journal, Sep. 10, 1999.*

A Computerized Business Method Is Patentable Subject Matter By Robert C. Scheinfeld and Lawrence T. Kass In New York Law Journal on Aug. 6, 1998.

* cited by examiner

RESTAURANT DIRECTORY AND MARKETING SYSTEM

BACKGROUND OF THE INVENTION

1. Field of the Invention

The present invention relates to electronic information delivery systems, and more particularly to an advertising and reservation computer network system useful in promoting restaurant services.

2. Description of the Prior Art

The globalization of our economy has evolved large, concentrated business structures to best realize cost effectiveness and optimum quality. Such large commercial structures now approach the size of whole economies, including complete infrastructures and communication networks for effecting interface ports with the consumer and supplier at both ends of the business process. Of course, on such a dimensional scale even the architecture of the communication infrastructure is highly focused to the particular aspects of the business and the external ports are also optimized.

Along with this trend in concentration there is also a trend in specialization of the employee pool. The same concerns over efficiency have also produced a highly specialized manpower pool engaged by the business prone to defer their basic activities like feeding and housing for execution by others. Thus along with concentration there is a concurrent increase in small, local enterprises providing services to the businesses' staff. Typically, these services are multivaried to match the consumers distribution of tastes and preferences, and are therefore most often carried out by minimal business structures.

Food services, in particular, are an expression of a wide variety in tastes, styles and preferences. There are those services that are devoted to pure convenience, like many of the fast food chains, and also those very specialised to a particuler taste, nutrient or ethnic pattern. Accordingly, the 'ma and pa' business format is especially prevalent in restaurant services, either as a local franchisee of a chain or as a singular family operation. This type of business format is characteristically underserviced by mass communication and is therefore practically concealed and unavailable to the consumer for lack of convenient exposure. Even when listed in some directory or other publication the exposure is limited in its depth and amount of information, focusing mainly on price.

The strong impetus for a varied food selection, however, persists and restaurant suggestions are a matter of frequent discourse. The subject, therefore, both forms a good base for electronic commerce and is particularly suited for customer inquiry by way of computer network.

Heretofore various techniques have been devised for electronic display, in one form or another, of a restaurant menu. One example of such a display is set out in the teachings of U.S. Pat. No. 5,845,263 to Camaisa et al., useful in communicating a menu selection to the kitchen. Other examples are illustrated in the series of divisional U.S. Pat. Nos. 5,597,307, 5,624,265, 5,749,735, 5,788,507, 5,795, 156, 5,839,905, 5,911,582 and 5,957,695 to Redford et al. Each of the foregoing describe paper, ROM or disc stored menus associated with a button to communicate the menu selection by a wireless 'remote control' to the kitchen. While suitable for the purposes intended the system described is a single restaurant dedicated system, exemplified also in U.S. Pat. No. 5,937,386 to Frantz. Frantz discloses a menu ordering system for a fast food restaurant in which the menu order is prepared and then assembled into a container and weighed to check accuracy. Thus the majority of the prior art concerns itself with the menu order communication to the kitchen.

With the advent of computer networks now fueling electronic commerce somewhat more ambitious assignments are possible. In other endeavors examples of such expanded system tasks have recently been expressed in U.S. Pat. No. 5,897,620 to Walker et al, dealing with airline ticket sales by reverse auction, U.S. Pat. No. 5,794,210 to Goldhaber et al, dealing with computer network advertising attention brokerage, and U.S. Pat. No. 5,193,056 to Boes, dealing with financial services. Some of the foregoing examples have formed the bases for substantial business ventures, serving as the vanguards of the newly emerging network commerce. Thus what used to be enclaves of personal service in ma and pa business format are now integrating into distributed architectures through the use of computer networks. These same advantages can be utilized with success in the last bastion of small business, the local restaurant. The computer network, now referred to as the Internet, allows for information sharing in easily searchable form thus exposing the restaurant to the consuming public.

The use of a network, however, entails substantial computing power. This available processing capacity may be used in conjunction with the restaurant listing to (i) enhance interest; (ii) assist in reservation and seating; and (iii) facilitate credit card payment. Additionally, the information may be linked with maps and directions to the restaurant, various attention inviting messages and other techniques for promoting and advancing inquiries to the web site. This logical coordination of information and interest enhancing techniques are a matter of driving concern in all retail commerce. Methods for economic inclusion of small enterprises in such an organized technique are desired and it is one such technique that is disclosed herein.

SUMMARY OF THE INVENTION

Accordingly, it is the general purpose and object of the present invention to provide a system imbedded on a computer network for convenient searching of a restaurant.

Other objects of the invention are to provide a searchable data base on which various restaurant enterprises can advertise.

Further objects of the invention are to provide a searchable restaurant data base coupled with computation sequences for determining seating availability and selection.

Additional objects of the invention are to provide a searchable restaurant data base and reservation system in which the credit card payment record is utilized as a seating index.

Briefly, these and other objects are accomplished within the present invention by way of a computer network, such as that now commonly known as "Internet", to which various personal computers [PCs] owned by consumers are selectively connected and which is also connected to information storing servers and shared computing stations. In conventional manner the server may be selectively loaded with data describing a restaurant, including such attention inviting information like a unique recipe for which the restaurant may be known, the vitae of the chef, or some video images of the restaurant facility or its setting. Along with that inscription of data, the restaurant manager may also inscribe its particulars relating to credit card payment and a seating chart. Typically, such data may be inscribed on one or more shared storage device, often referred to as a server, which may be associated with one or more shared arithmetic processors to perform such arithmetic functions as are entailed in any credit card transaction.

In accordance with the present invention these same shared storage and arithmetic functions may be used for advance seating reservation and even advance food order, thus allowing better management of seating space and kitchen utilization. Moreover, a record of use, i.e., the length of seating utilization associated with each food order, can be accumulated thereby allowing for a constantly corrected (weighted) data base for an automated seating reservation system. These automated benefits are available to each subscribing restaurant owner.

In more detail, each subscribing restaurant that seeks to join the web site is assigned a web page on which certain categorized information is inscribed along with such other information as the restaurateur deems of interest and prone to attract inquiries. The required information may comprise items like the restaurant address, menu listing, seating capacity and credit card facility which may then be selectively linked to other sites like those providing a directions map. Also included shall be an e-mail address for the restaurant through which the prospective customer can express his or her reservation interest.

The foregoing reservation request shall be effected in parallel with an arithmetic process carried out on the web site to continuously update the record of seating history, the concurrent senior reservations outstanding and the expected tenure of each occupied seat. If this computation indicates available seating for the time requested, a return e-mail is automatically generated confirming the reservation. If, on the other hand, the automated computation indicates a seating conflict a further arithmetic operation can be carried out to indicate the next available seating time. The reservation requester can then either accept the altered time, decline the transaction or request home delivery. For those instances where excess seating capacity is indicated a seating chart may also be displayed indicating the choice of seats available and, of course, home delivery may be the preference selected by the client at the outset. In this manner the prospective customer is accomodated while the kitchen process of the restaurant is optimized.

The foregoing functions, and those further set out below, can be imbedded in the architecture of the novel restaurant web site which may be organized along various search parameters. In one search mode the prospective customer may direct the inquiry in a Boolean combination, for example like "Chinese" and "South Philadelphia", which will then display a list (and address) of the subscribing restaurants that match these search criteria. At that point the individual restaurants in the displayed list can be examined further for the menu and some of its other attributes. Upon completion of this examination the customer may then transmit the date and time of the proposed reservation along with the customer's return e-mail address and if the previously described concurrent automated seating sequence indicates a match the reservation is automatically confirmed by a return e-mail. If an immediate time match is not obtained the system then proposes the closest alternative time which the customer either accepts or rejects by return e-mail or by logging off the restaurant's web page. Alternatively, the customer may select directly the home delivery option, either at the inception of the process or when the customer's date and time preference can not be met.

The arithmetic sequence attending to the order may also effect credit card transactions, thereby providing an accounting credit entry to the transaction. For those instances when seating is requested the closure of the entry can then be utilized in developing a running 'average' seating interval that is useful in resolving the competing reservation requests of course, the same payment computation may also inspect the order detail to maintain sufficient inventory, in a manner similar to that described in the brochure for the MICROS 2700 system by Micros Systems Inc., 12000 Baltimore Ave., Beltsville, Md., or in the teachings of Redford, supra, thereby further reducing the management task for the restaurateur.

Those in the art will appreciate that the foregoing summary adopts the symbolic convention of the Internet, like the web, web site and web page now in use. In this convention large, highly organized system blocks are subsumed in a single expression and the use of simple abbreviated symbolism is not intended to reduce the complexity of the task. Moreover, the examples of prior system segments selected above are not suggested as the sole options and are illustrative only. In this vein one may want to take reference to the teachings of U.S. Pat. No. 5,963,924 to Williams et al as an illustration of one manner of credit card payment accounting in electronic commerce useful herein, and the teachings of U.S. Pat. No. 5,794,210 to Goldhaber et al as an example of the system requirements in obtaining the consumer's attention.

Thus, in addition to the convenience provided to each restaurateur the inventive system is also a vehicle for conveying other advertising as well as a mechanism for selecting consumer profile data useful in compiling data bases. Of course, the pervasive public interest in food services and the variety of tastes enhances both of these functions. The inventive system, therefore, provides all these advantages while also simplifying the task of the restaurant owner.

DESCRIPTION OF THE PREFERRED EMBODIMENT

A. Definitions:

Those in the art will appreciate that the technological setting of the present invention is currently going through explosive growth. Accordingly, the nomenclature and conventions of this technology are in constant flux and in changing definition. In order to properly describe the present invention against this changing backdrop the following definitions shall be utilized herein:

The term Web shall refer to a distributed hypertext system accessible by variously configured computing devices, not owned by any single entity (most often referred as the Wold Wide Web Consortium maintained by the Massachussets Institute of Technology in the United States and by INRIA in Europe);

The term Web Site shall refer to a location on the web dedicated to publish a particular set of information;

The term Uniform Resource Locator [URL] is an address coordinate or code for each item or set of items of information on the web, and includes the largest information set referred to as the web site;

The term Web Page refers to a subset of information within the web site set, usually dedicated to a particular subject or category;

The term Browser shall refer to a set of computer system instructions that direct the computer's access to the web and assist in the searching therethrough;

The term Gopher shall refer to a set of computer instructions associated with a web site that are useful in the task of searching through the site;

The term Server shall refer to a sequence of instructions associated with a web site conformed to respond to the requests of a browser, typically imbedded in a data processing device associated with data storage;

The term Network shall refer to a communication system accessible by several computing and storage devices for transmitting data therebetween;

The term Personal Computer shall refer to one of a variety of commercially available data processing devices generally conformed for personal use; and The term Processor shall refer to a logical processing system capable of executing a sequence of logical commands, either as part of an arithmetic computation or as a part of executing a program.

Figure 1:
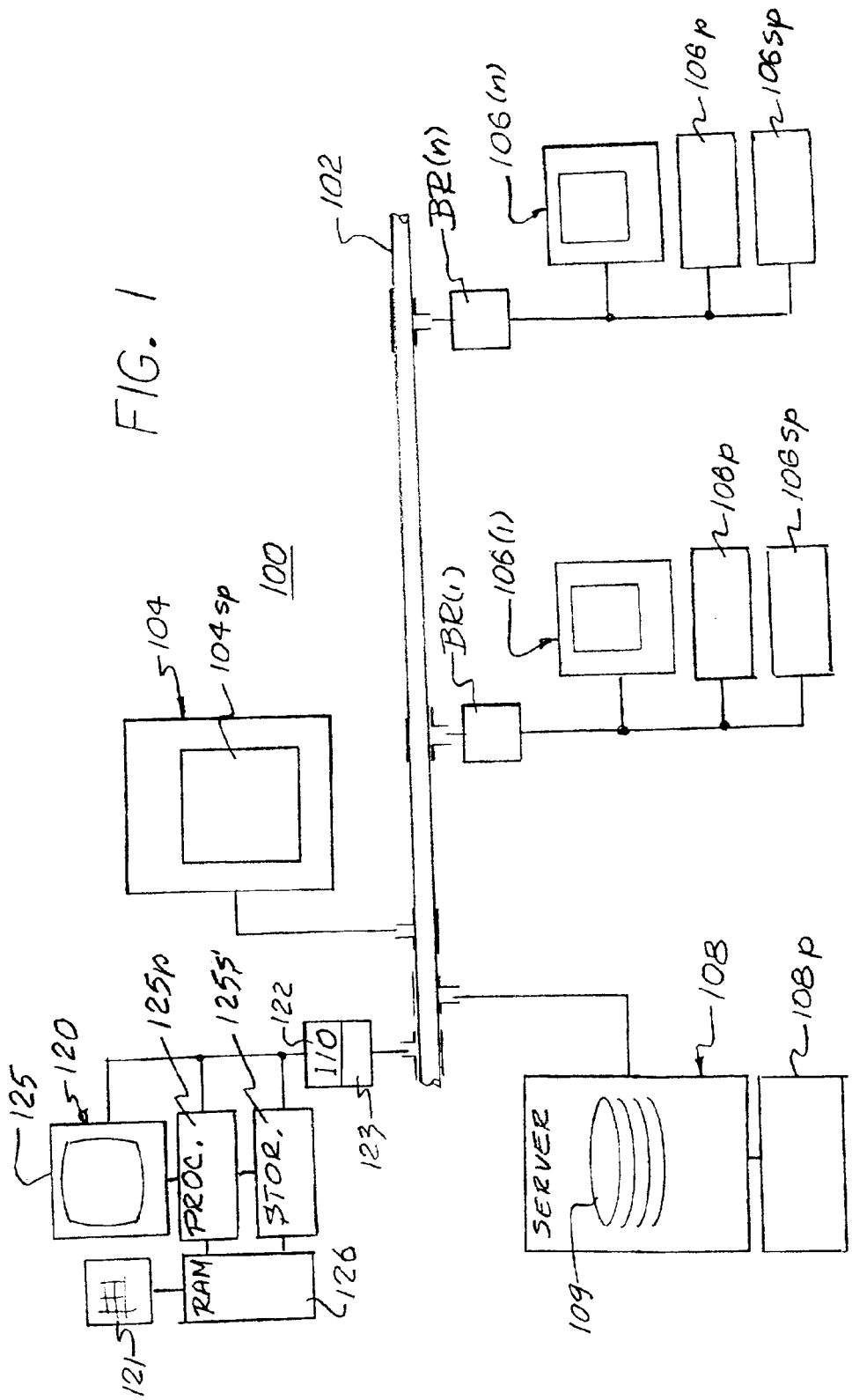
FIG. 1 is a diagrammatic illustration of a computer network communication system conformet to operate in a manner useful with the present invention.

B. Operative Embodiment:

As shown in FIG. 1, a computer communication system, generally designated by the numeral 100, is characterized by a network 102 to which one or more personal computers 106(1) through 106(n) are connected. Network 102 also connects to at least one server system 108 and to a processor system 104. Those in the art will appreciate that while the foregoing description illustrates by elemental concepts like network, processor, server or computer, this fractioning is exemplary only. For example, processor system 104 can refer to some stand-alone processor, but in most practical instances its processing functions may be distributed the personal computers 106(1)–(n) or the server system 108, and for that reason each one thereof is shown to include its own processing stage 106p or 108p. Similarly, the network structure itself may include various communication media like audio frequency (telephone) wire, fiberoptic cable, radio link and/or video cable, integrated through appropriate interfaces like modems, converters or repeaters. Thus the foregoing network arrangement is illustrative only, it being the intent to express by this example the various network forms that now comprise a communication system like the Internet.

Attached further to the network 102 are one or more subscribing terminals 120 each in the form of a personal computer 125 provided with a keyboard 121, an input/output (I/O) port 122, and a communication interface 123. Computer 125, moreover, includes its own processing stage 125p and storage 125s, which in accordance with the description below, may share in the processing tasks set out herein in conjunction with its temporary [RAM] memory 126. These processing tasks cooperate with a disc storage 109 forming a part of the server system 108 in which the subscriber system 120 is assigned its own web page and the computation sequences for determining reservation and seating. Of course, this web page is part of the web site coordinated by the server 108 which can be inspected and searched by the several processors 106(1) through 106(n).

It will be appreciated that the foregoing arrangement essentially duplicates the overall functional architecture of a data processing system, excepting of course the synchronization and timing constraints of its bus (equivalent to the communication network 102) and the various control signals thereof. In this asynchronous equivalent, shown in FIG. 2, the processor PP is distributed amongst processors 125p, 104, 106p and 108p, temporary memory TM may be distributed along scratchpad sections 126, 104sp, 106sp and 108sp and permanent data storage DS in the disc file 109. The resulting logical process carried out by this system architecture is controlled by its bus system BS, here the network 102, analogous to any other data processor, and is therefore generally shown by way of the flow chart in FIG. 3 describing the seating reservation process in accordance with the present invention.

This logical process may be organized in various segments amongst the several storage locations, or may be wholly resident in storage 109, to express its results in one of the system languages like the Standard Generalized Markup Language [SGML] useful in a network. In accordance with the description following this process, upon the invocation of its Uniform Resource Locator [URL], transmits to the inquiring customer's computer 106(1) its home page which thereafter directs the information interchanges and links.

Figure 3:
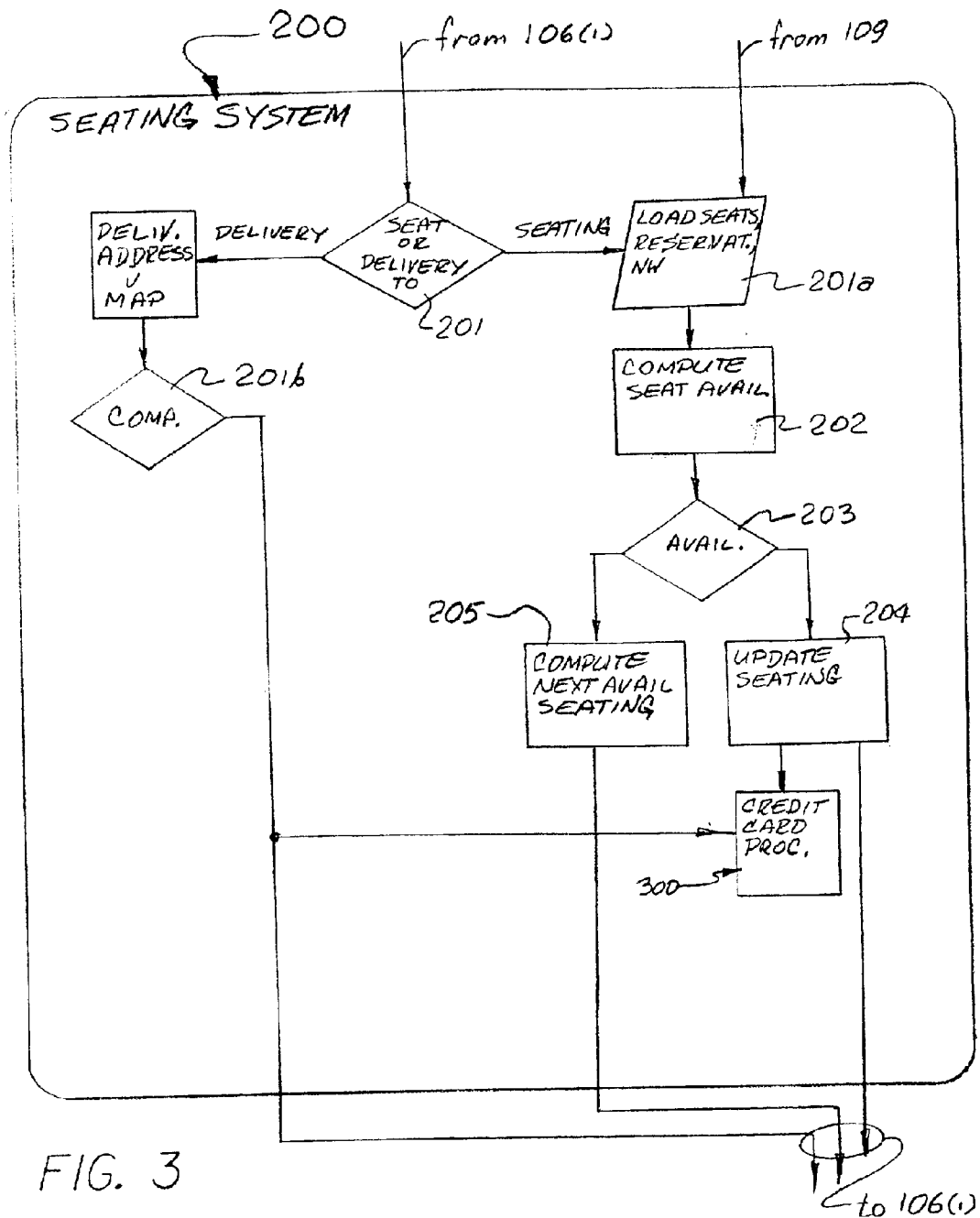
FIG. 3 is a flow chart of a seating reservation system effected in accordance with one function of the present invention.

As shown in FIG. 3, the prospective customer, having first selected from the network 102 the subscribing restaurant 120, through his personal computer 106(1), inserts in response to an inquiry on the computer screen, into a processing branch node 201 of the inventive operating system 200, either the date, time and number of people of the proposed reservation, or a delivery request to a specified address. If a seating reservation is requested branch segment 201a is loaded from the disc storage 109 with the seating chart of the selected restaurant, its current reservation status as maintained by the subscribing system 120, and a weighting number NW computed on the basis of a running average seat occupancy interval TI. With these inputs step 202 then computes the seating available for the requested time and if the request is matched in step 203 the reservation is confirmed. At the same time the seating availability is updated in step 204 which also collects the current credit card transactions to clear those seats that have been earlier comitted and also to update the seat interval weighting number NW and the new average seat occupancy interval TI.

If the seating reservation request can be accommodated then step 203 provides a confirmation to the network 102. If the computation, however, does not produce a seating match then the sequence branches to step 205, computing with the most recent weighting numbers the next available time to the requester 106(1). The requester may then accept the new time proposal and the sequence of steps 201, 202, 203 and 204 is cycled through once more, producing a confirmation for the new time. Alternatively, the client may request home delivery through step 201, branching to step 201b which compares the delivery address against a stored map of the area that the restaurant elects to service. If the delivery address matches, a confirmation is returned and the order amount is charged against the credit card in the manner described below.

Figure 4:
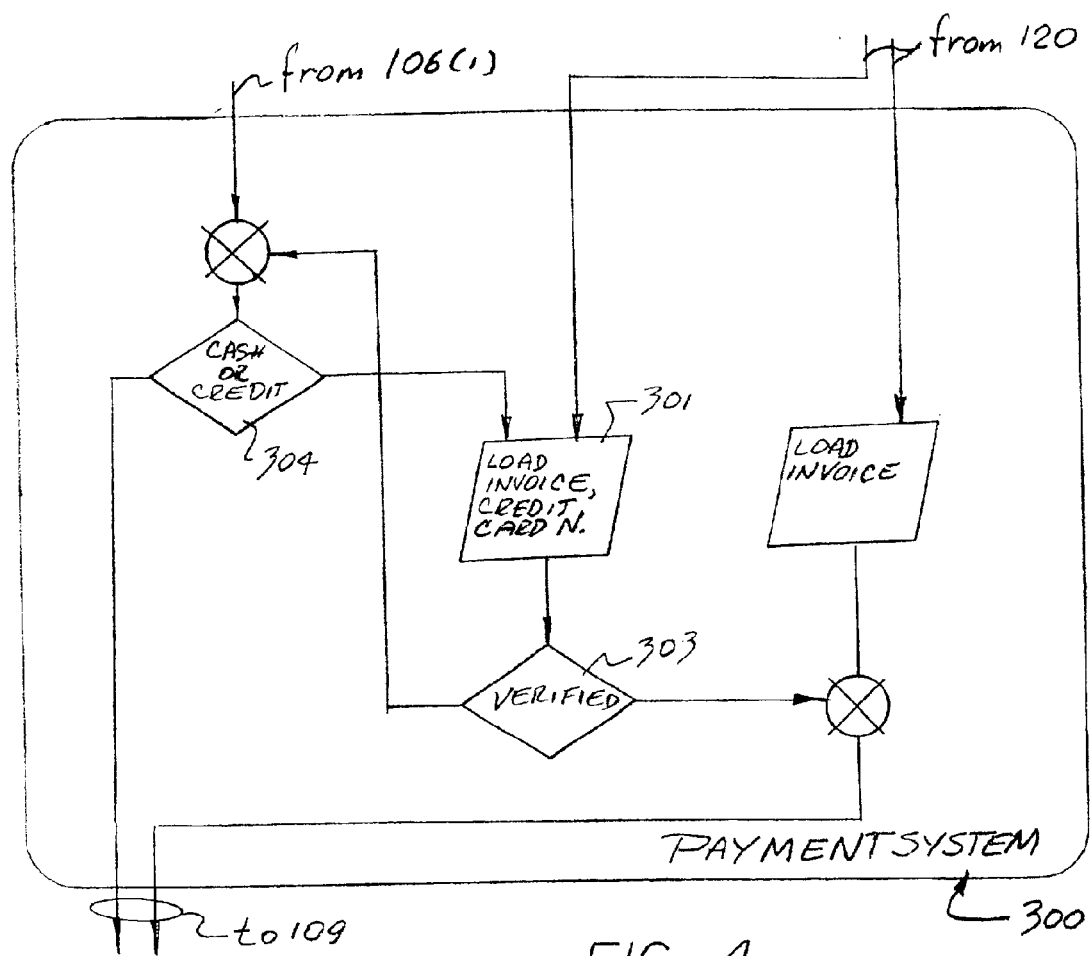
FIG. 4 is yet another flow chart of a credit card payment and restaurant invoice reconciliation process illustrating a further functional operation in accordance with the present invention.

The above described seat reservation sequence may be performed in parallel with credit card payment reconciliations and/or an automated cash register system like the above mentioned restaurant system by Micros Systems, Inc. Thus as the restaurant bill for the table is reconciled in the payment crediting process a concurrent correction is available to be made in the seating chart. One example of a credit card reconciliation system is illustrated in FIG. 4, conformed to provide a concurrent seating vacancy signal SV. As shown in FIG. 4 the payment reconciliation system 300 may be resident in the storage of the subscribing computer 125, in which the invoice data is loaded in step 301, along with the table number. Upon payment in step 302 the credit card number may be loaded for transmission onto the network 102, together with the seating vacancy signal SV. In step 303 the card is verified and, if verified and payment authorized, the credit is booked to the subscribing proprietor. Alternatively, in step 304 a cash transaction is booked to the vacated table, again producing signal SV onto the network 102, or is charged to home delivery without altering seating. In all instances either a cash or a credit card transaction is opened which is then manually closed by the return of the endorsed receipt.

In either instance signal SV is returned to step the seating reservation system 200 and combined with the prior reservation data to establish the seating interval TI. This interval is then averaged with a selected number of the most current preceding intervals to produce the weighting number NW. Accordingly, the invoice reconciliation process is also utilized to develop the necessary inputs for the seating reservation process.

It is to be noted that the foregoing processes may be combined with various other payment techniques such as those of a direct bank debit or the automatic teller system, or those described in U.S. Pat. No. 5,963,924 to Williams et al relating to secure network financial transactions at the consumer commerce level. Moreover, the prospective customer may be given the option of securing the reservation by his or her credit card, entailing the further sequence of a secure credit card authorization as a part of the confirmation process. This particular aspect may be uniquely attractive to the more exotic or the higher priced restaurant in which optimal seating utilization is required.

The use of a particular credit or debit card both in the course of reservation and at its conclusion is therefore a prevalent event, and the inventive web site may also obtain benefit as a mechanism for displaying and enhancing a particular credit card provider. Since each restaurateur may want to engage in further interest enhancement, obtained by way of various attention focusing techniques not directly tied to restaurant services, an added benefit for the credit card provider.

In addition the restaurant may elect to publish on its web page some interesting food recipes which the home devotee may want to search out. Alternatively, wine selections and pedigree lists may be published, each with the focus on the culinary arts which are prone to invite the consumer to the restaurant. These indirectly benefit the credit card provider who may therefore want to underwrite the web site expense.

Figure 2:
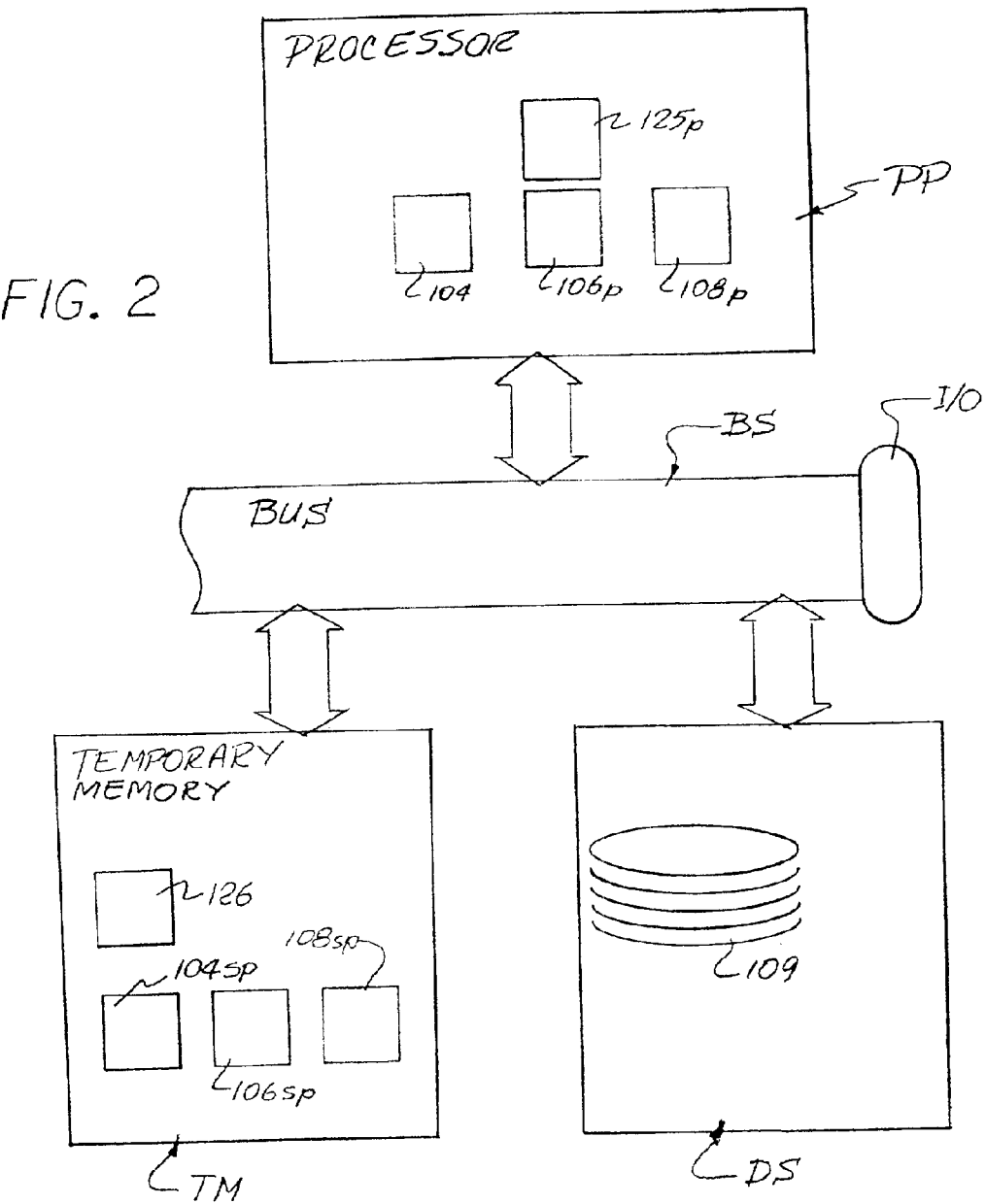
FIG. 2 is a general network system analog arranged in a data processing architecture useful with the inventive system.
Figure 6:
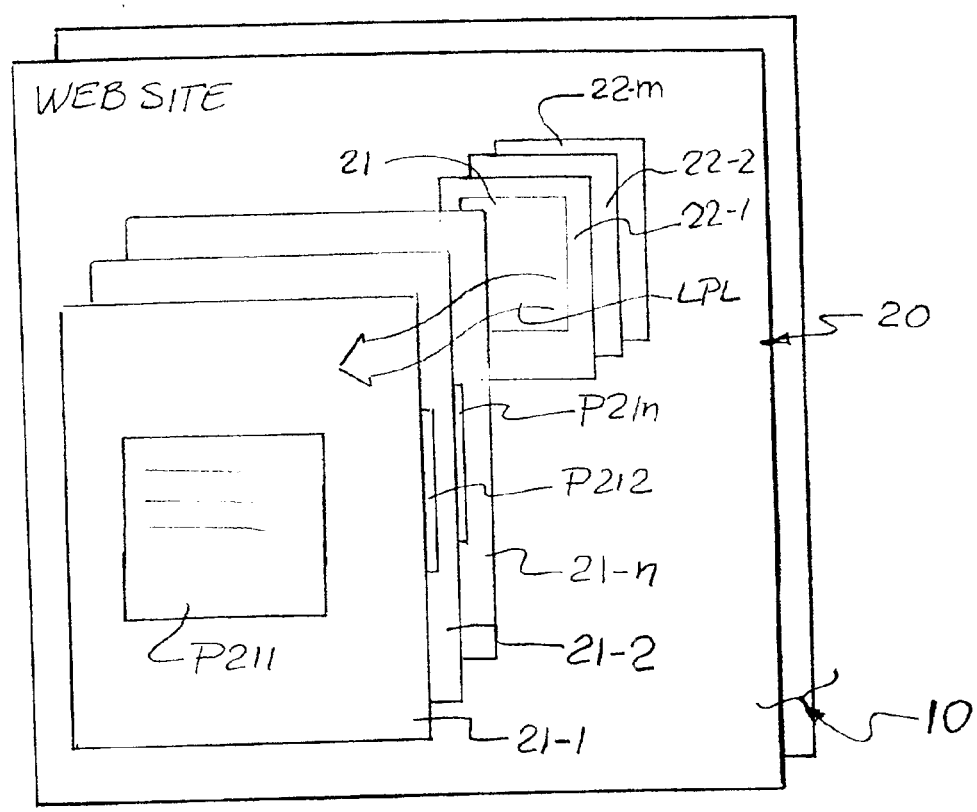
FIG. 6 is an illustration of a web site layout in accordance with the present invention together with the links appended thereto to the various screen restaurant displays.

These and other attention garnering devices are combined with the above described restaurant reservation and payment systems in a web site organized according to FIGS. 2 and 6. It will be noted that the unsynchronized varying nature of the devices comprising a network requires control and interpretation and the processing system PP therefore includes an interface process, generally referred to as a browser, which in itself may take various forms. Thus a browser BR(1) through BR(n) is interposed between each of the individual user stations 106(1) to 106(n), which may be of various forms, and the subscribing station 125 is similarly provided with its own interface controller 129. For example using station 106(1) may use a commercially available browser BR(1) known by its commercial term NETSCAPE, while BR(2) may be the one known by its commercial designation MICROSOFT(R) INTERNET EXPLORER, and so on. These differing browsers essentially form the operating system of the network.

In this setting the inventive restaurant listing system, generally designated by the numeral 10, comprises a restaurant web site 20 which includes a listing 21 of the various subscribing restaurants each associated with an address or URL 21-1 through 21-n classified by geographic location, price interval, taste and other sorting indicia. Also included in web site 20 are other attention garnering mechanisms, in the form of text or image pages 22-1 through 22-m, each containing text and/or images selected by the subscribing restaurants which in one way or another focus the reader's attention thereon. For example, page 22-1 may include various food preparation recipes arranged for searching, each recipe including a local path link LPL pointing to the corresponding restaurant URL 21-1 to 21-n in the listing 21. Page 22-2 may, in turn, collect various wine lists again pointing to the recommending restaurant URL, and so on. In this manner many of the interests associated with food are made available for searching. Thus various modes for selecting a restaurant are provided.

Associated with each URL 21-1 through 21-n is an interactive information page P211–P21n on which the restaurant menu and some of its other attributes are listed. Also included is an interactive questionaire IQ1–IQn in which the prospective customer expresses his or her scheduling desire, and the number of expected patrons in the group. The customers return e-mail address may also be included to allow a confirmation message.

Figure 5:
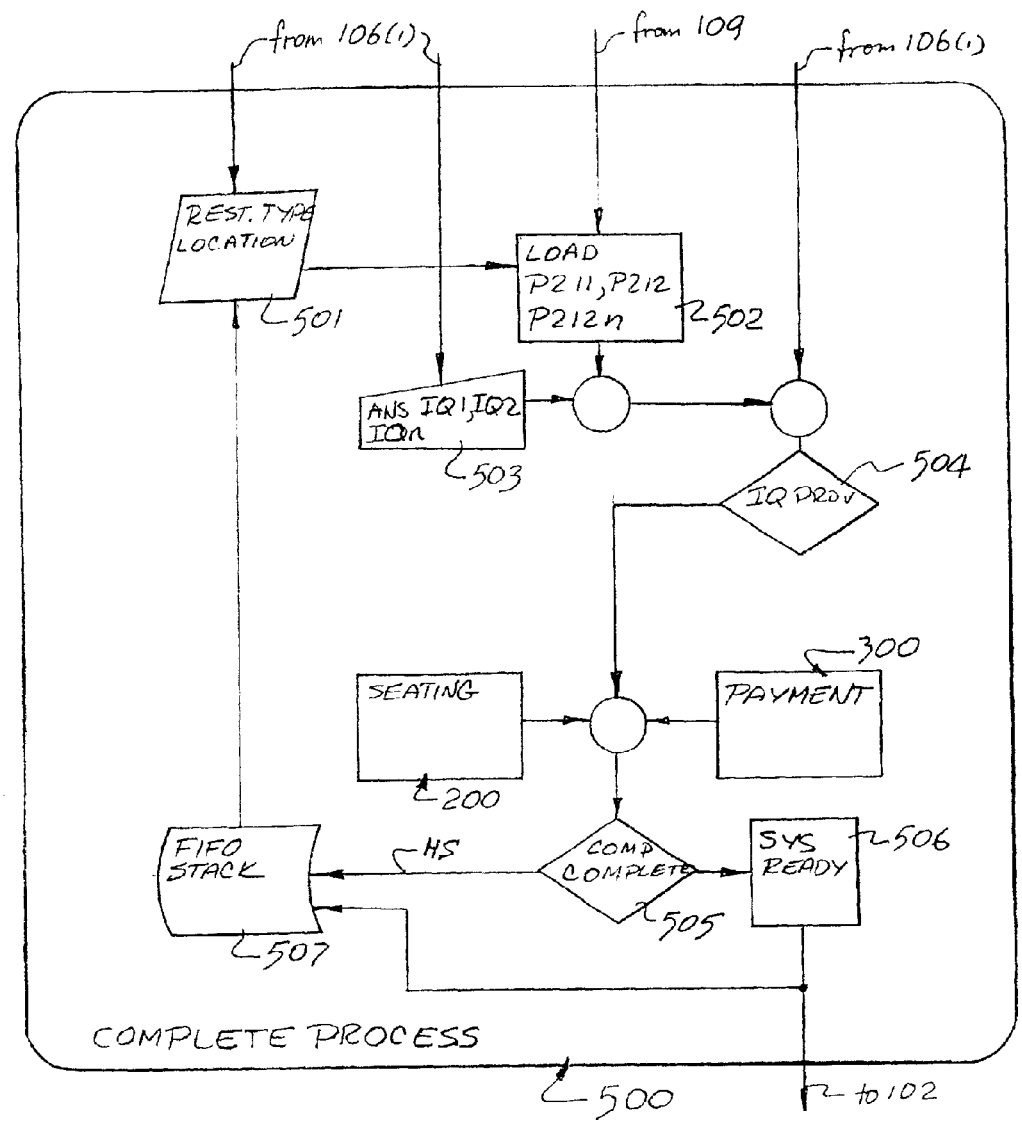
FIG. 5 is a further flow chart of the inventive restaurant listing and reservation system incorporating the operations illustrated in the flow charts set out in FIGS. 3 and 4.
Figure 7:
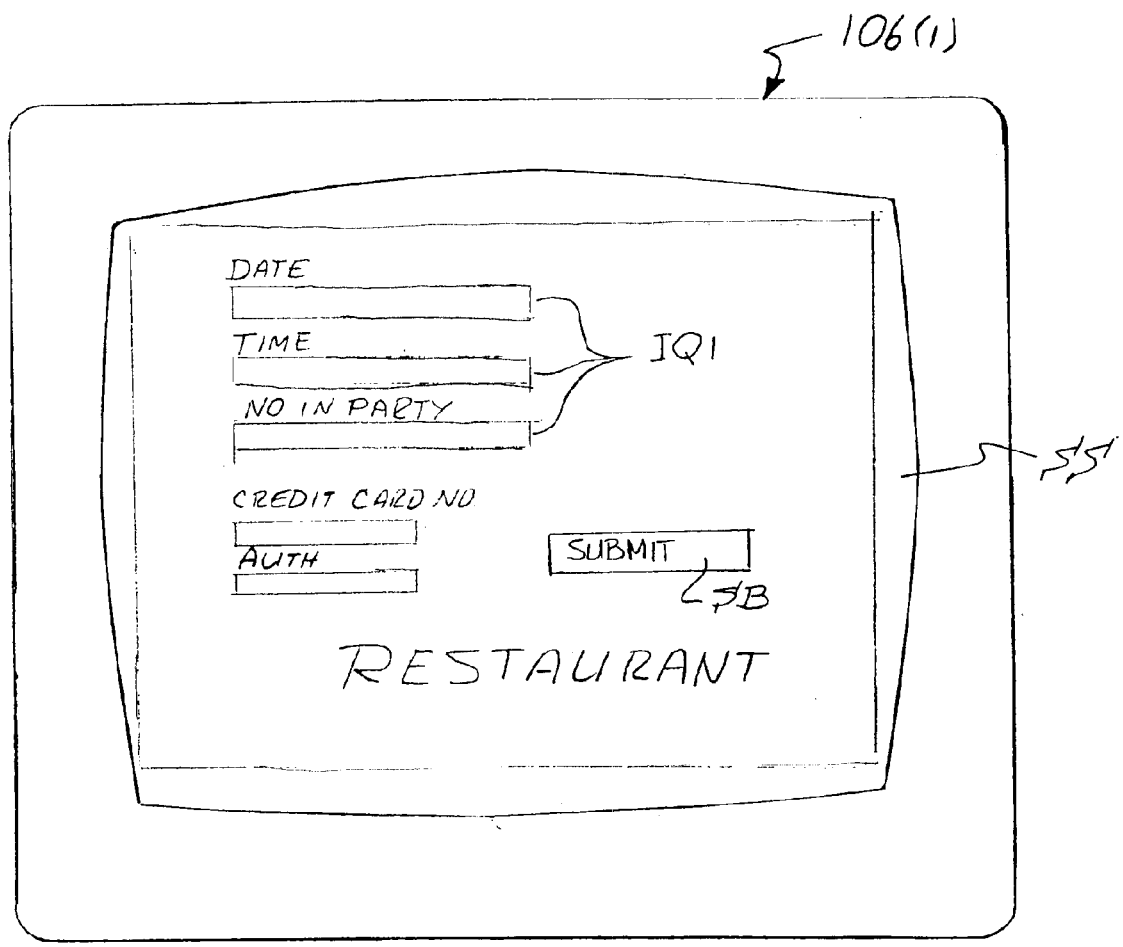
FIG. 7 is a screen layout detail illustrating the interactive data exchange between the prospective restaurant patron and the restaurant's reservation process.

It is this interactive information P211–P21n that, in the manner illustrated in FIGS. 5, 6 and 7, either confirms the availability of the reservation request or rejects it, in a manner like the rejection of an incomplete order. The process of step 203 of FIG. 3, therefore, is analogical to an order sequence with the incomplete reservation evoking as a response the new suggested reservation time. The prospective customer communicating with the network 102 through his or her personal computer 106(1), for example, then toggles a "SUBMIT" button SB on the users screen SS which confirms the reservation for the new time. Thus in a manner analogous to the electronic shopping described in U.S. Pat. No. 5,715,314, a new reservation time is confirmed.

As a further part of this confirmation process the questionaire IQ1 on the screen SS may also include a credit card inquiry which is later useful in effecting payment, and which may include an assessment of some 'cancellation' fee should the patron fail to meet the reservation schedule. It is this credit card inquiry and billing sequence that has been previously described in FIG. 4, by reference to the payment system 300.

Those in the art will appreciate that method for running programs on a web server is most often effected by way of a convention known as CGI (Common Gateway Interface) script. By this convention processor 109 can be asynchronously controlled, together with the extraction of data from the storage 108 wherein the CGI script is a control and interpreter program between the web server and some other programs on the network, in this instance the program shown in FIG. 5. Like numbered parts functioning in like manner, the process shown in FIG. 5, generally as the process 500, combines in step 501 the request from a customer's processor, e.g., processor 106(1), for a class of restaurants (by geography, price, etc.,). In response the server program 502 selects from storage 109 those pages corresponding to URLs 21-1 through 21-n of the restaurants matching the search criteria and displays such in short abstract form on the processor screen. In step 503 the customer then selects the abstract of most current interest resulting in the transfer of the descriptive restaurant information P211, P212 or P21n, like the menu and seating options (e.g., indoor or outdoor). Along with that information is also transferred the corresponding interactive questionaire IQ1, IQ2 or IQn.

In step 504 the prospective customer either provides the information requested in IQ1 through IQn, or simply logs off. If the customer elects to enter the data requested by IQ1 both the seating sequence 200 and invoice reconciliation 300 are set up and the above described interactive exchange of seat reservation and thereafter reconciliation of vacated seats is carried out. In step 505 a test is conducted to see if all the computations are complete and if the answer is yes the process advances to step 506 to indicate that the process 500 is ready for the next request. This step then enables a first-in-first-out FIFO stack 507 in which the competing customers seating requests are held for the restaurant in chronological order. Stack 507 is in essence a pointer stack, simply identifying which request is to be advanced into step 501 next. If the step 505 indicates an as yet incomplete process a hold signal HS is passed to stack 507, to hold it at its current stack position.

In this manner all the conveniences of automated seating and payment management are provided to a small enterprise which will greatly assist in the conduct of its business. Moreover, the system may be further as the core information stream useful in controlling the management of personnel and even food inventory reserves. In addition, since the system attends to one of the more common interests of human life it is also useful as a vehicle for displaying other advertising information, with the advertising fees then being used to cover the system expense.

It is to be noted that while the foregoing description refers to a sequence of organized steps, such are symbolic expressions of detailed logical processes which may be variously distributed in the network. The division of steps hereinabove described is to be considered for the descriptive aspects thereof and not as an expression of physical boundaries.

Obviously, many modifications and variations can be effected without departing from the spirit of the instant invention. It is therefore intended that the scope of the invention be determined solely by the claims appended hereto.

It is claimed:

1. A computer network assisted method for managing remotely requested restaurant seating reservations, comprising the steps of:

connecting a plurality of computer terminals to said network including a plurality of first computer terminals each associated with a corresponding one of a plurality of restaurants and a plurality of second computer terminals each associated with a corresponding one or more prospective restaurant patrons;

calculating on each said first computer terminal a continuously updated weighted use interval for each corresponding one of said restaurants, wherein each said calculated weighted use interval is determined by the further steps of:

recording the time of payment for restaurant services for each seat in the corresponding restaurant;

subtracting from said time of payment the time of the corresponding reservation of each said seat; and, averaging the time difference in said subtracting step with prior time differences for the seats of said corresponding restaurant;

communicating by way of a selected one of said second computer terminals to a first computer terminal associated with a selected one of said restaurants a reservation request signal including a desired time and number of seats;

computing at said first computer terminal associated with said selected one of said restaurants the number of seats available at the desired time at said selected restaurant on the bases of the most currently updated one of said calculated weighted use intervals and comparing said number of seats requested at said desired time against said number of seats available; and accepting said reservation request signal if said number of seats requested is less than said number of seats available.

2. A method according to claim 1, further comprising:

proposing an alternative next available seating time if said number of seats requested is greater than said number of seats available at said requested time.

* * * * *